United States Patent

[11] 3,627,085

[72] Inventors Ishi Habuka;
Kazuko Habuka; Takashi Habuka, all of 23-8, 3-Chome, Sengoku, Bunkyo-ku, Tokyo-to, Japan
[21] Appl. No. 873,899
[22] Filed Nov. 4, 1969
[45] Patented Dec. 14, 1971

[54] AUTOMATIC BRAKING DEVICE IN SPRING MOTOR
3 Claims, 2 Drawing Figs.
[52] U.S. Cl. ................................................. 188/184, 185/37
[51] Int. Cl. ................................................. B60t 7/12
[50] Field of Search ...................................... 188/180, 184; 185/37; 242/84.52 R, 156

[56] References Cited
UNITED STATES PATENTS
| | | | |
|---|---|---|---|
| 1,230,560 | 6/1917 | Camp | 188/184 UX |
| 1,616,142 | 2/1927 | Rotter et al. | 188/184 X |
| 2,232,605 | 2/1941 | Holmes | 188/184 X |
| 2,685,946 | 8/1954 | Pferd et al. | 188/184 |
| 2,829,754 | 4/1958 | Norcross | 188/184 X |

Primary Examiner—Duane A. Reger
Attorney—Holman & Stern

ABSTRACT: An automatic braking device in which a stationary cylinder is fixed to a dead shaft of a spring motor, at least two expanding brake shoes are pivoted on a rotatable drum of the motor and centrifugally operated to contact and apply frictional force to the inner surface of the stationary cylinder when the drum speed exceeds a predetermined value, and spring means for exerting return torque on the brake shoes. This braking device thus operates automatically to brake the drum and thereby absorb and dissipate kinetic energy which would otherwise cause impact.

Patented Dec. 14, 1971
3,627,085
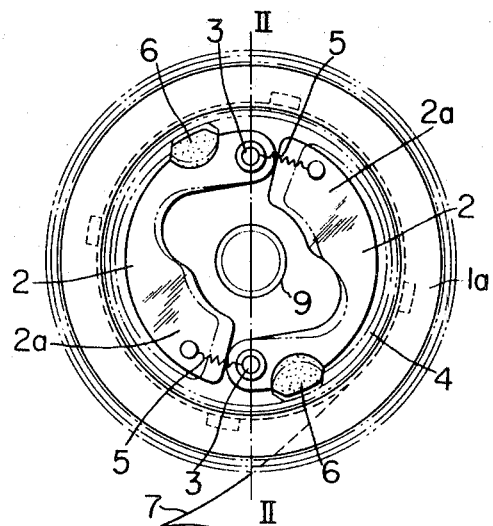
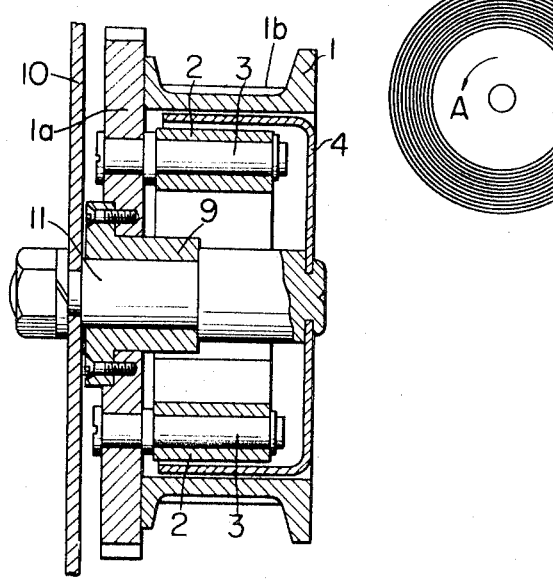
INVENTORS
ISHI HABUKA ET AL
BY Holman, Glascock,
Downing & Seebold
ATTORNEYS 3,627,085

AUTOMATIC BRAKING DEVICE IN SPRING MOTOR

BACKGROUND OF THE INVENTION

This invention relates generally to spring motors and to braking devices, and more particularly to a new automatic braking device of a spring motor having a drum, which device absorbs and dissipates impact by braking the drum at the time when the motor undergoes restoring or returning motion.

A spring motor generally has a stationary part for mounting on some base structure and a rotatable part which can be driven by a motive-power spring. In a common type of spring motor known heretofore, there are provided two drums, on one of which is wound a ribbon spring in a prestressed state whereby it has a tendency to curl up or wind itself into a tight roll. The outer free end of this ribbon spring, constituting the above mentioned motive-power spring, is connected to and wrapped around the periphery of the other drum, constituting the above mentioned rotatable part and herein referred to as the windup drum.

Accordingly, when this windup drum is rotated in the direction to take up the ribbon spring, this spring is unwound from the first drum, counter to the tendency of this spring to curl up, and exerts a return torque on the windup drum. This return torque is utilized to sustain tension in a cord or rope or to impart windup torque to winding drums of devices such as route or destination indicators for displaying information on roll screens.

When a torque load on the windup drum or a locking force which holds this drum in a rotational position wherein the ribbon spring is taken up thereon is removed, the drum is caused by the spring to undergo rapid rotation, which gives rise to violent impact at the termination thereof such as to cause breakage of the spring and other parts and dangerous scattering of broken pieces of material. Such an impact, moreover, has frequently caused damage to and malfunctioning of the devices driven by the spring motor.

SUMMARY OF THE INVENTION

It is an object of the present invention to overcome the above described difficulty heretofore accompanying spring motors by providing in a spring motor an automatic braking device for braking the drum at the time of its return rotation thereby to absorb and dissipate most of the kinetic energy which would otherwise cause impact.

Another object of the invention is to provide an automatic braking device of the above-stated character which is of simple, compact, and relatively inexpensive construction and of simple and reliable operation.

According to the present invention, briefly summarized, there is provided an automatic braking device of the above-stated type characterized by the combination of a cylindrical stationary case fixed to a stationary part of a spring motor, at least one brake shoe pivoted at one proximal end thereof on a rotatable part (drum) of the motor and having a friction element for contacting and applying braking resistance to the stationary case when the rotatable part rotates at a speed exceeding a predetermined value to cause the brake shoe to pivot under centrifugal force, and spring means to exert a return torque on the brake shoe.

The nature, principle, details, and utility of the invention will be more clearly apparent from the following detailed description with respect to a preferred embodiment of the invention when read in conjunction with the accompanying drawing, in which like parts are designated by like reference numerals.

BRIEF DESCRIPTION OF THE DRAWING

In the drawing:

FIG. 1 is a side view, with parts represented in diagrammatic form with the outer cover removed, showing the essential parts of one example of a braking device embodying the invention; and FIG. 2 is a sectional view taken along the transverse plane indicated by line II—II in FIG. 1.

DETAILED DESCRIPTION

Referring to the drawing, the spring motor in which the automatic braking device of the invention is installed has a windup drum 1 coupled to mechanism (not shown) for driving a member to be wound such as a rope or a roll screen for displaying inscriptions (not shown). This drum 1 is open at one end and has a sidewall 1a, at the center of which there is provided a hub 9 rotatably supported on a dead shaft 11 fixed at one end thereof to a fixed structure 10 such as a baseplate. Thus the drum 1 is rotatably supported.

One end (free end) of a ribbon spring 7 is fixed to a winding part 1b of the windup drum 1. This ribbon spring 7 has a tendency, imparted thereto during its production by prestressing, to curl up or wind itself into a tight roll and, being anchored at its other (inner) end to a spool drum 8, imparts thereto a driving torque urging the spool drum 8 in the arrow direction A in FIG. 1.

In accordance with the present invention the windup drum 1 is provided with an automatic braking device which, in the illustrated example, is a centrifugal expanding brake installed within the hollow space of the drum 1 and comprising, essentially, a pair of reniform brakeshoes 2, 2 and a cylindrical stationary case 4 enclosed within and clear of the drum 1. The case is fixed coaxially to the dead shaft 11. The brakeshoes 2, 2 are in opposed positions about the shaft 11 with the concave or inner sides thereof facing each other. The convex or outer sides of these brakeshoes are semicircular and confront the inner cylindrical wall surface of the stationary case 4. The brakeshoes 2, 2 have proximal ends pivoted on pivot pins 3, 3 disposed on diametrically opposite sides of the shaft 11 and distal ends 2a, 2a constituting weights or large-mass parts and terminating in the vicinity of respective pivot pins 3, 3. A tension coil spring 5 of the required spring force is fixed at one end thereof to a pivot pin 3 of each brakeshoe 2 and at the other end thereof to the distal end 2a of the other brakeshoe. Each brakeshoe 2 is further provided on its convex or outer side with an outwardly projecting brake friction element 6 of a high coefficient of friction fixed integrally to the brakeshoe and adapted to contact the inner surface of the stationary case 4 when the brake shoe is moved outward by centrifugal force which overcomes the force of the spring 5.

The braking device of the above described organization according to the invention operates in the following manner. When a member such as a rope or a roll screen is wound, windup drum 1 coupled thereto is caused to take up ribbon spring 7, overcoming the force thereof tending to wind itself into a tight roll, and is thus held. Consequently, the windup side and unwound side are maintained in a tensioned state whereby a member stretched therebetween, such as a rope, is prevented from slackening, while a member such a roll screen is stretched in a taut state for display without wrinkles.

When the windup side is released, or when windup drum 1 is released because of some cause such as a defect, the drum 1 tends to be rotated abruptly by the force of ribbon spring 7 to cause the aforementioned undesirable results if it were not for the braking device of the invention.

In the present mechanism as the abrupt rotation of the windup drum begins and increases in speed, brake shoes 2, 2 are caused by centrifugal force to pivot outward about the pivot pins 3, 3, overcoming the forces of their respective coil springs 5, 5, whereby their distal ends 2a, 2a, constituting weights are swung outward, and the brake friction elements 6, 6 contact the inner surface of stationary case 4. The resulting frictional resistance to movement of the brake friction elements 6, 6 is imparted as a torque to the brake windup drum 1 and reduces its rotational speed.

When the rotational speed of the drum 1 decreases, the centrifugal force acting the brakeshoes 2, 2 decreases, and the brake friction elements 6, 6 separate away from the inner surface of the stationary case 4, whereupon the rotational speed of the windup drum 1 again increases. As a result, the brakeshoes 2, 2 operate again in the above-described manner to brake the windup drum 1 thereby to prevent its abrupt or rapid rotation and, at the same time, to absorb the impact energy at the final termination of the rotation.

Thus, the braking device according to the invention is installed in built-in state within a windup drum of the instant type and is capable of fully controlling abrupt rotation applied to the windup drum and other windup mechanisms coupled thereto. Accordingly, impact stress due to abrupt stopping of these mechanisms is prevented, and malfunctioning due to breakage of the ribbon spring and damage to other mechanisms is completely eliminated. Furthermore, since the braking device is accommodated compactly within the windup drum, there is no necessity of attaching any accessory on the outside part of the entire apparatus.

We claim:

1. A spring motor comprising, in combination, a stationary structure, a shaft fixed to said stationary structure, a windup drum rotatably mounted on said shaft and comprising a transverse annular wall and a cylindrical winding part fixed to the wall, a stationary cup-shaped case rigidly mounted on said shaft with its cylindrical sidewall located closely adjacent to the inner wall of said cylindrical winding part in coaxial relationship to the latter, at least one brakeshoe pivoted at one proximal end thereof on said transverse annular wall and having a brake friction element fixed thereto at a position other than said proximal end, with said brake friction element being adapted to contact the inner surface of said sidewall of the cup-shaped case to impart braking torque to said windup drum when the latter rotates at a speed exceeding a predetermined value to cause said brakeshoe to pivot under centrifugal force, spring means to exert a return torque on the brakeshoe tending to separate the same from said inner surface, a separate spool drum rotatable on a stationary axis and spaced apart in parallelism to said windup drum, and a ribbon spring fixed at one end to said winding part of said windup drum to be wound around the winding part and at the other end to said spool drum, and said ribbon spring having a tendency to curl up or wind itself into a tight roll on said spool drum thereby to impart a driving torque urging the windup drum.

2. The spring motor as claimed in claim 1, including at least two brakeshoes each of reniform shape having a free distal end and pivoted at a proximal end thereof on a pivot pin rigidly secured on said transverse annular wall of the windup drum, said brakeshoes being arranged in a circle with equal spacing and with the proximal end of one brakeshoe confronting the distal end of the adjacent brakeshoe in the circumferential direction, and said spring being a tension spring anchored at its ends to and stretched between each pivot pin and the distal end of the adjacent brakeshoe.

3. The spring motor as claimed in claim 1, further including a hub member rigidly secured to said transverse annular wall of the windup drum and rotatably mounted on said shaft for rotatably supporting the windup drum on the shaft.

* * * * *